United States Patent [19]

Lawther et al.

[11] Patent Number: 5,430,515

[45] Date of Patent: Jul. 4, 1995

[54] APPARATUS FOR CONTROLLING THE MOVEMENT OF A FILM CARTRIDGE FROM A LOADING CHAMBER IN A CAMERA

[75] Inventors: Joel S. Lawther, Rochester; Donald P. Mcginn, Palmyra, both of N.Y.

[73] Assignee: Eastman Kodak Company, Rochester, N.Y.

[21] Appl. No.: 75,969

[22] Filed: Jun. 11, 1993

[51] Int. Cl.⁶ .................. G03B 19/10; G03B 17/26
[52] U.S. Cl. ........................... 354/174; 354/275
[58] Field of Search ............ 354/174, 288, 275, 281; 242/71.1

[56] References Cited

U.S. PATENT DOCUMENTS

| | | | |
|---|---|---|---|
| 3,543,664 | 12/1970 | Kreme et al. | 352/74 |
| 3,693,525 | 9/1972 | Barber | 95/31 |
| 4,333,615 | 6/1982 | Kluczynski et al. | 242/71.1 |
| 4,482,232 | 11/1984 | Engelsmann et al. | 354/275 |
| 4,697,903 | 10/1987 | Koda et al. | 354/288 |
| 4,889,292 | 12/1989 | Loewe et al. | 242/71.1 |
| 5,049,914 | 9/1991 | Dassero | 354/288 |
| 5,122,823 | 6/1992 | Baxter et al. | 354/212 |
| 5,142,316 | 8/1992 | Tanii et al. | 354/212 |
| 5,155,514 | 10/1992 | Tamamura | 354/174 |
| 5,159,365 | 10/1992 | Takahashi et al. | 354/21 |
| 5,187,514 | 2/1993 | Ikenoue | 354/275 |

FOREIGN PATENT DOCUMENTS

| | | | |
|---|---|---|---|
| 0441662 | 8/1991 | European Pat. Off. | |
| 4230524A1 | 3/1993 | Germany | G03B 17/26 |
| 5732435 | 2/1982 | Japan . | |
| 58-121026 | 7/1983 | Japan | G03B 17/26 |
| 4070637 | 3/1992 | Japan . | |
| 4080734 | 3/1992 | Japan . | |
| 4080735 | 3/1992 | Japan . | |
| 4090530 | 3/1992 | Japan . | |

Primary Examiner—M. L. Gellner
Assistant Examiner—Nicholas J. Tuccillo
Attorney, Agent, or Firm—David A. Howley

[57] ABSTRACT

A camera is disclosed which includes a loading chamber for receiving a film cartridge. A groove in the film cartridge is engaged by a retention member during movement of the film cartridge from the loading chamber. The retention member allows the film cartridge to move partially out of the loading chamber but prevents the film cartridge from completely moving out of the loading chamber. The retention member is capable of being disabled to allow the film cartridge to be completely moved out of the loading chamber.

10 Claims, 8 Drawing Sheets

APPARATUS FOR CONTROLLING THE MOVEMENT OF A FILM CARTRIDGE FROM A LOADING CHAMBER IN A CAMERA

FIELD OF THE INVENTION

This invention relates generally to the field of photography, and, more particularly, to apparatus associated with controlling the movement of a film cartridge from a loading chamber in a camera.

BACKGROUND OF THE INVENTION

In conventional cameras, a film cartridge is loaded into a loading chamber. Film in the film cartridge is manually or automatically loaded into the camera. Images are then recorded on the film after which the film is rewound into the film cartridge. A door covering the loading chamber is opened and the film cartridge is removed so that the film can be processed.

In older 35 mm cameras, the film cartridge is loaded into the loading chamber in a direction perpendicular to the cartridge spool. More recently, cameras have been developed in which the film cartridge is loaded in a direction parallel to the cartridge spool or end first. Such a camera is disclosed in U.S. Pat. No. 5,155,514 which issued in the name of Tamamura on Oct. 13, 1992.

In the Tamamura reference, a film cartridge 1 is pushed down into a loading chamber 12. By pushing the cartridge into the chamber, an end 1a of the cartridge contacts a sloped face 7a of a lock lever 7, causing the lock lever to be moved to the right. The cartridge is pushed into the chamber against a spring 11. Once the cartridge is completely in the chamber, a spring 9 forces lock lever 7 to the left, thereby retaining the cartridge in the chamber against the force of spring 11. A cover member 6 is then moved to the left to cover the loading chamber.

When it is desired to remove the film from the loading chamber, cover member 6 is moved to the right against a spring 8. The movement of cover member 6 causes lock lever 7 to move to the right against a spring 9. When the lock lever is moved far enough to the right, portion 7d of the lock lever disengages the upper surface of the cartridge, allowing the cartridge to move out of the loading chamber under the influence of spring 11.

PROBLEM TO BE SOLVED BY THE INVENTION

A problem with the mechanism in Tamamura is that when the lock lever is moved to the right, releasing the cartridge, there is nothing further to prevent the cartridge from moving out of the loading chamber. If the camera is oriented so that the loading chamber is in a near horizontal position or upside-down, the film cartridge may be ejected completely out of the loading chamber by spring 11. If the operator is not prepared to catch the ejected film cartridge, the cartridge may fall and strike a hard surface, thereby becoming damaged and possibly ruining the film contained therein.

SUMMARY OF THE INVENTION

According to one aspect of the invention, a camera is disclosed which includes a loading chamber for receiving a film cartridge. A portion of the camera and film cartridge engage during movement of the film cartridge from the loading chamber, allowing the film cartridge to move partially out of the loading chamber but preventing the film cartridge from completely moving out of the loading chamber. The engaged portion of the camera and film cartridge is capable of being disabled to allow the film cartridge to be completely moved out of the loading chamber.

ADVANTAGEOUS EFFECT OF THE INVENTION

An advantage of the present invention is that the film cartridge is prevented from accidentally falling out of the loading chamber. As such, the film cartridge cannot strike a hard surface and be damaged. When the operator is ready to completely remove the film from the loading chamber, the operator grasps the film cartridge and pulls it out of the chamber. As such, the operator's hands are assured to be grasping the film cartridge when it is completely removed from the loading chamber.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
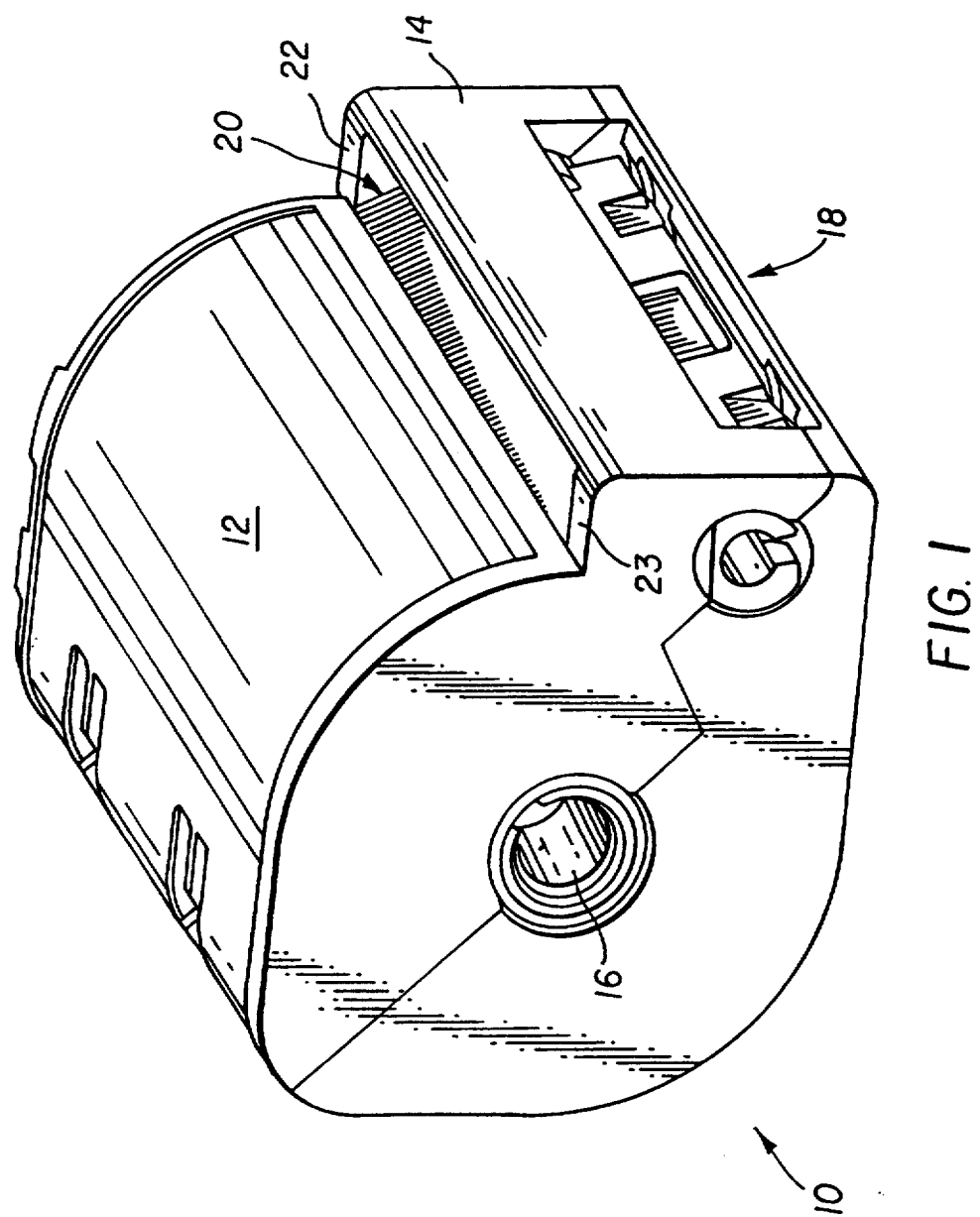
FIG. 1 is a perspective view of a photographic film cartridge.

Referring now to the drawings, FIG. 1 shows a film cartridge generally designated by the reference numeral 10. The film cartridge is preferably made of a material such as plastic and includes a housing 12 having a lip 14. A spool 16 is rotatably mounted inside the housing. Wrapped on the spool is a photographic filmstrip (not shown) which can be thrust through an opening 18 in lip 14. A groove 20 is located on an inner surface 22 of lip 14. The groove is preferably parallel with spool 16 and extends a substantial portion of the length of lip 14. One end of the groove is defined by a portion 23 of lip 14.

Figure 2:
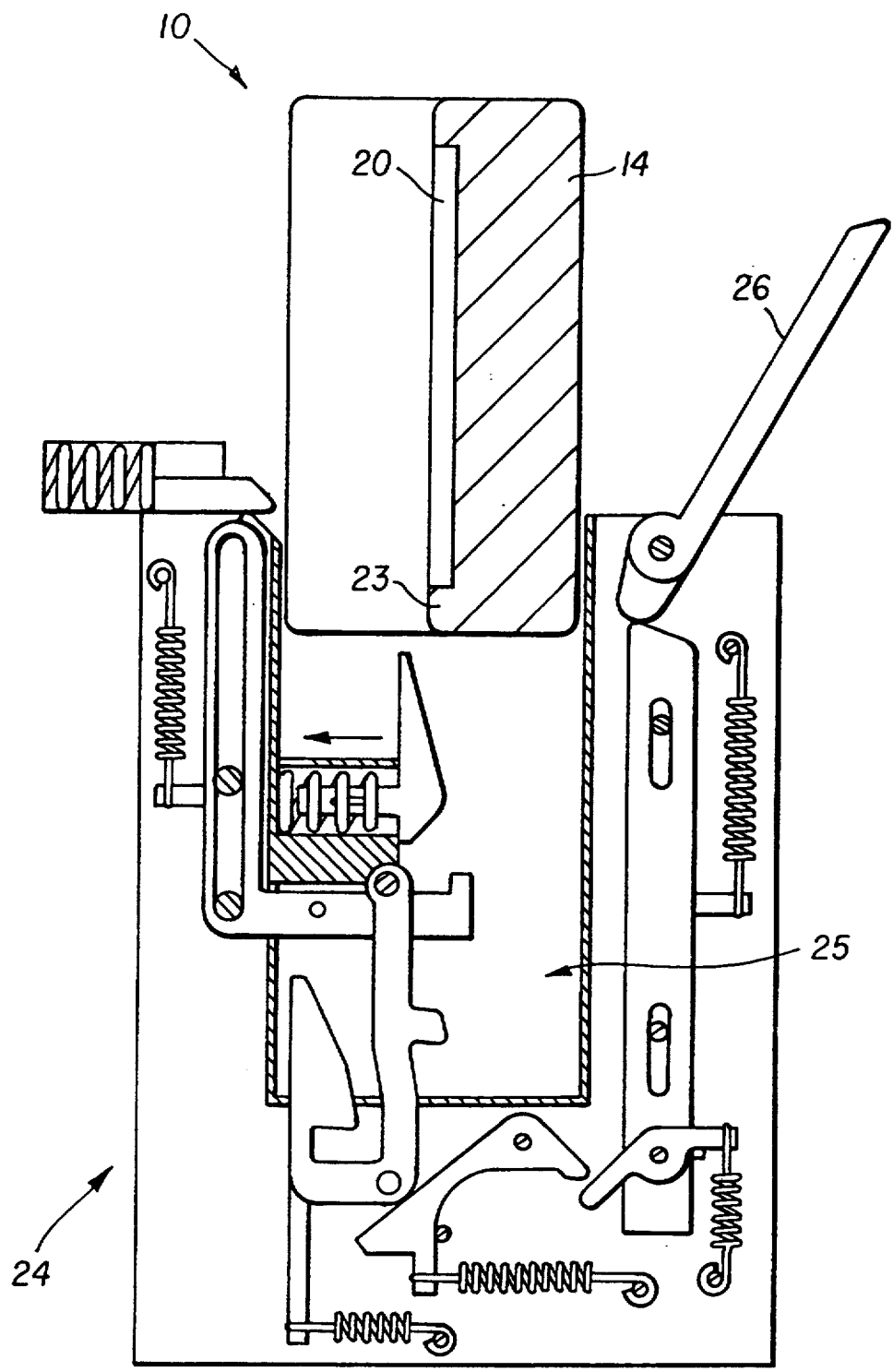
FIGS. 2-8 are side schematic views representing a camera loading chamber and a film cartridge during various stages of the film cartridge being inserted into and removed from the loading chamber.

Turning now to FIG. 2, there is shown a portion of a camera designated generally by the reference numeral 24. The camera includes a loading chamber 25 shaped to receive and discharge film cartridge 10 end first. A cover door 26 is shown in an opened position which allows the film cartridge 10 to be loaded into loading chamber 25. It should be noted that in FIGS. 2-8 a portion of lip 14 has been removed to facilitate viewing of groove 20.

Figure 3:
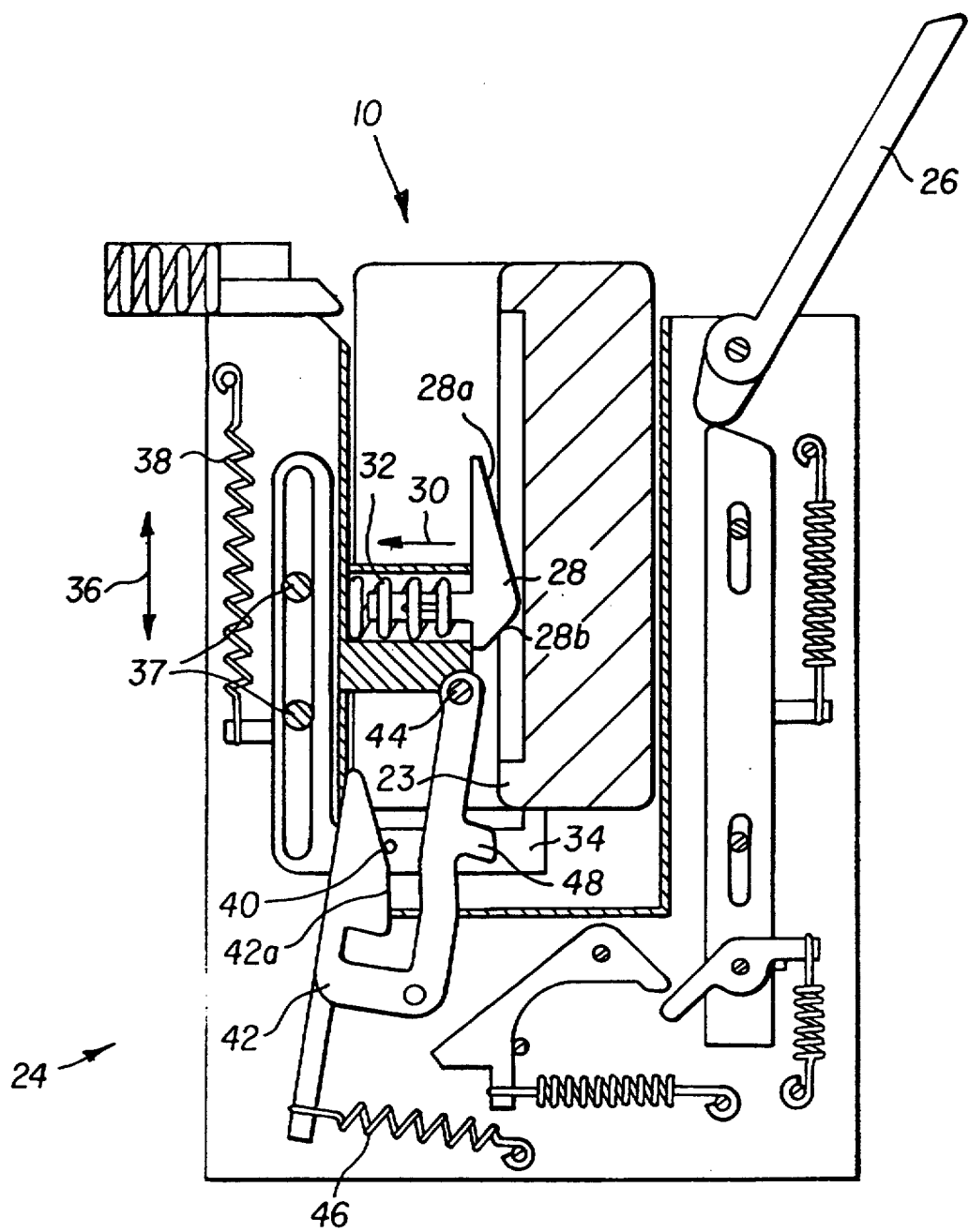

In FIG. 3 the film cartridge has been inserted a substantial distance into the loading chamber. As the film cartridge is lowered into the loading chamber, portion 23 of lip 14 engages a retention member 28. The retention member has a pair of inclined surfaces 28a and 28b and is moveable in the direction of arrow 30. Further, retention member 28 is connected to a compression spring 32. As the film cartridge is further lowered into the loading chamber, portion 23 of lip 14 presses against surface 28a, causing retention member 28 to move in the direction of arrow 30. As the film cartridge is lowered further, portion 23 rides past retention member 28. Retention member 28 is then urged in a direction opposite to arrow 30 by spring 32 such that the retention member engages or is inserted into groove 20.

As the film cartridge is lowered into the loading chamber, one end of the cartridge contacts an elevator 34. The elevator moves in the direction of an arrow 36 and is guided by a pair of pins 37 which ride in a slot located in the elevator. A tension spring 38 is connected to the elevator as is a pin 40. As the cartridge is further lowered, it pushes the elevator down against the force of spring 38. In addition, pin 40 engages a cam surface 42a of lock member 42, causing the lock member to pivot clockwise about a pivot 44 against the force of a tension spring 46. The rotation of lock member 42 causes a lock lip 48, which is part of the lock member to be moved out of the path of portion 23 of lip 14.

Figure 4:
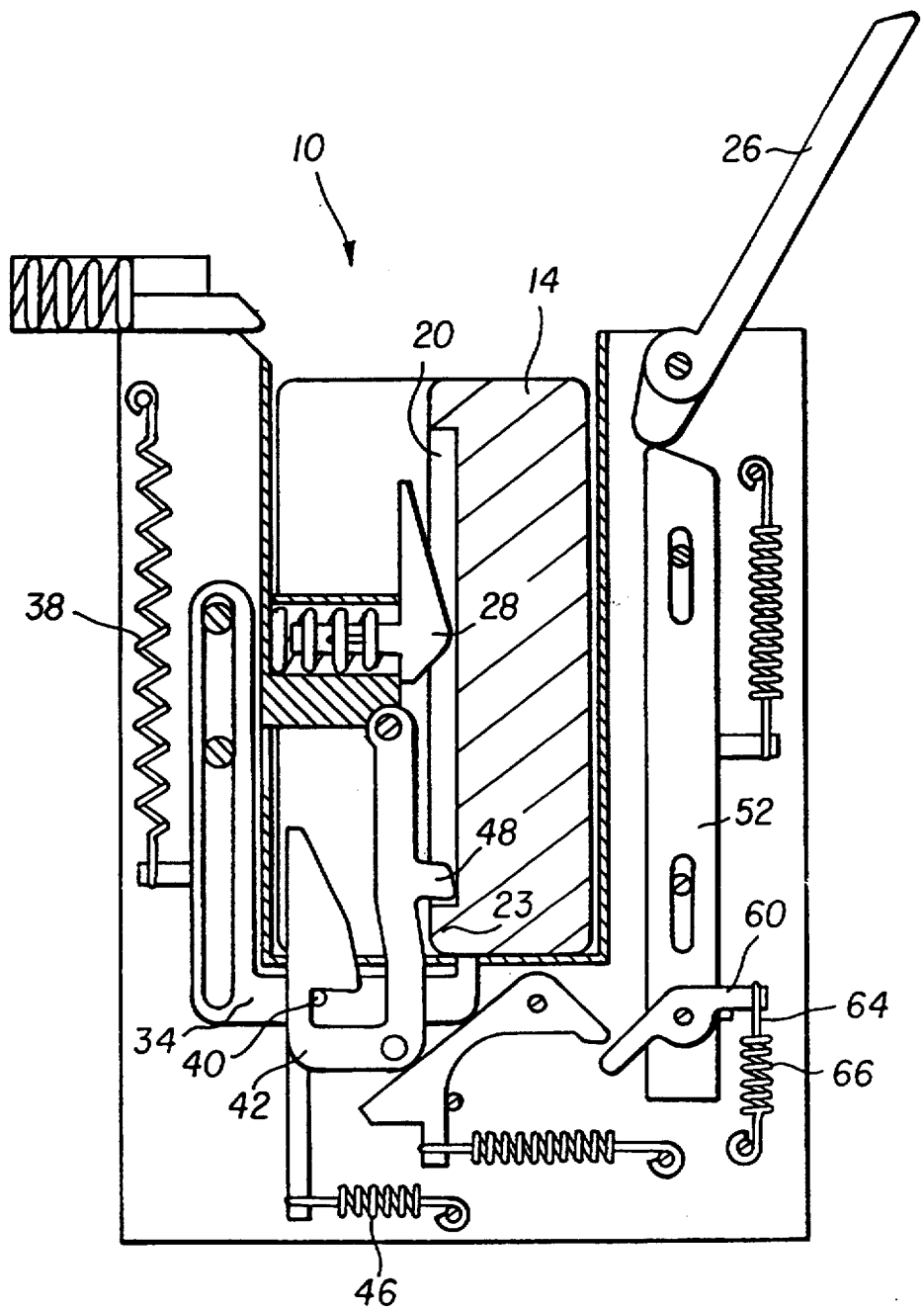

Referring to FIG. 4, the film cartridge has been completely inserted into the loading chamber. Retention member 28 is engaged into groove 20. Elevator 34 is at its lowermost position. As elevator 34 is lowered, pin 40 continues to rotate lock member 42 until spring 46 returns the lock member to its position shown in FIG. 4. Lock member 42 retains elevator 34 in its lowermost position by preventing pin 40 from moving up. Now lock lip 48 is engaged into one end of groove 20. There is a small space between lock lip 48 and portion 23. The lock lip prevents the film cartridge from partially falling out of the loading chamber prior to closing cover door 26. Such an arrangement eliminates any force on the cartridge for urging the cartridge out of the loading chamber prior to moving the cartridge out of the loading chamber, thereby allowing the film cartridge room to be properly positioned by a film driving mechanism (not shown).

It should be noted that the lowering of the film cartridge to its bottom position in the loading chamber will not move door 26 from its opened position. As such, an operator can load the film cartridge into the loading chamber without the cover door starting to close. Consequently, the operator will have clear access to the loading chamber and will have no risk of getting their fingers pinched by the closing door.

Figure 5:
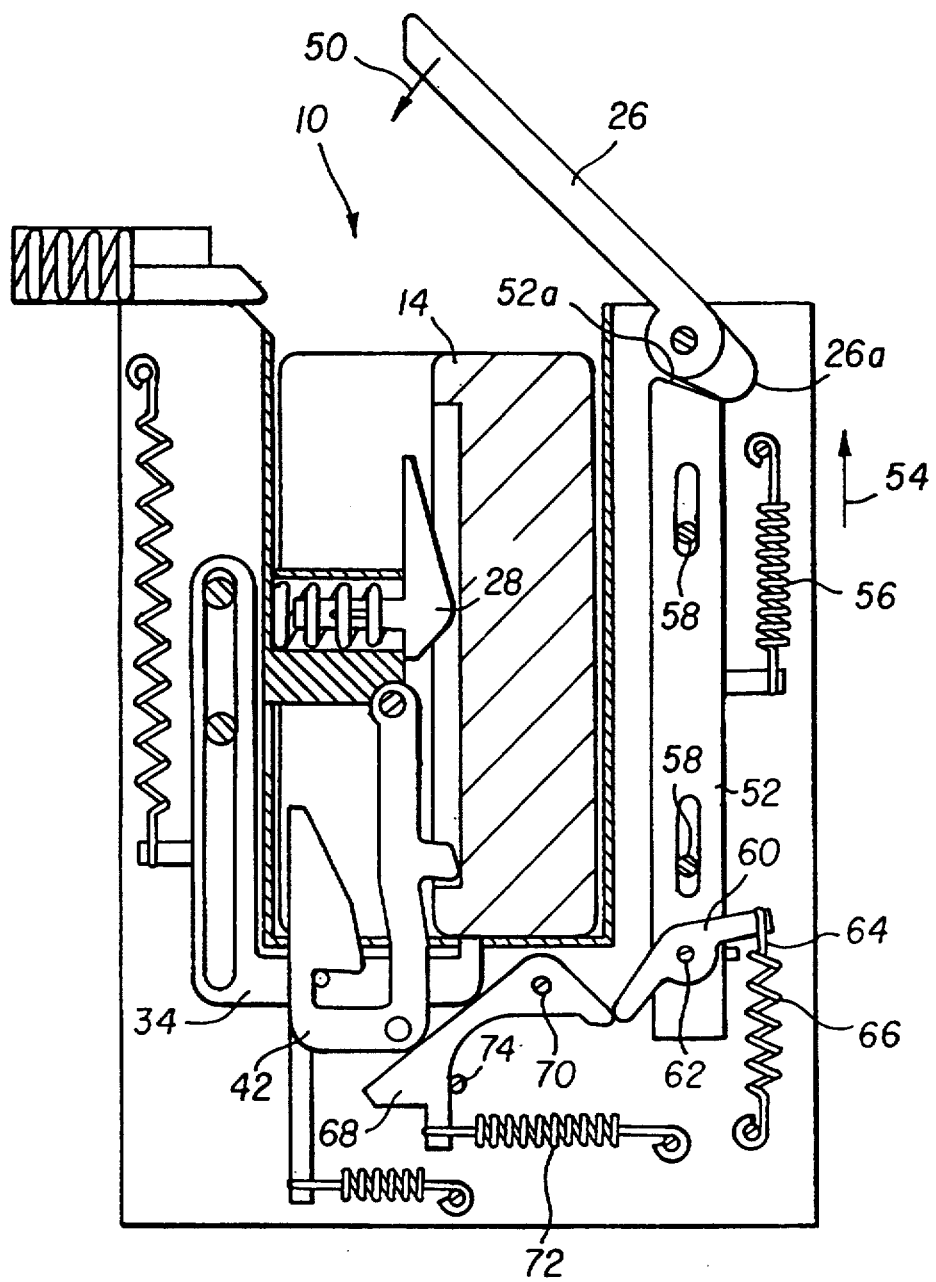

With reference to FIG. 5, once the film cartridge is loaded into the loading chamber, cover door 26 is rotated in a direction indicated by arrow 50. As cover door 26 is rotated, a cam surface 26a on the cover door, which engages a surface 52a of a plate 52, allows the plate to move in a direction indicated by arrow 54. The plate moves under the influence of a tension spring 56. Movement of the plate is guided by a pair of pins 58 which ride respectively in a pair of slots in the plate. A rocker arm 60 is rotatably mounted on plate 52 with a pin 62. As seen in FIG. 4, when cover door 26 is fully opened, rocker arm 60 is rotated against a projection 64, mounted on plate 52, by a tension spring 66. As plate 52 is moved in the direction of arrow 54, rocker arm 60 is likewise moved. A surface of rocker arm 60 contacts a surface of a member 68, causing the rocker arm to rotate counter-clockwise about pin 62. Member 68 is mounted for rotation with a pin 70 and is biased in a counter-clockwise direction by a tension spring 72 such that member 68 rests against a fixed pin 74.

Figure 6:
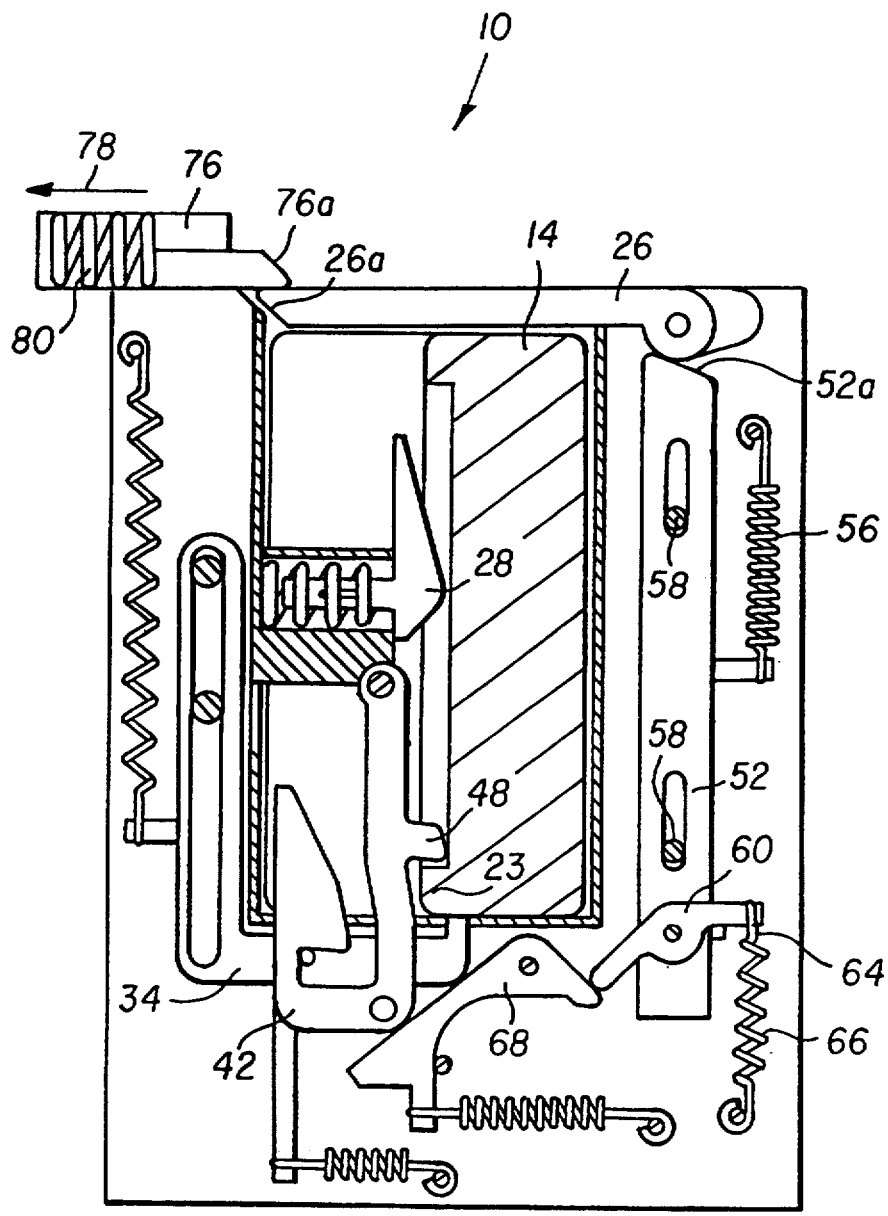

Turning to FIG. 6, as cover door 26 continues to close, an inclined surface 26a of the cover door contacts an inclined surface 76a of a door latch 76. This contact causes the door latch to be moved in the direction of an arrow 78 against the force of a compression spring 80, allowing the cover door to swing past the door latch. When cover door 26 is completely closed, door latch 76 is returned to its original position by spring 80. Consequently, cover door 26 is retained in the closed position. Rocker arm 60 has now bypassed member 68 and has returned to its original position (see FIG. 4) relative to plate 52.

Figure 7:
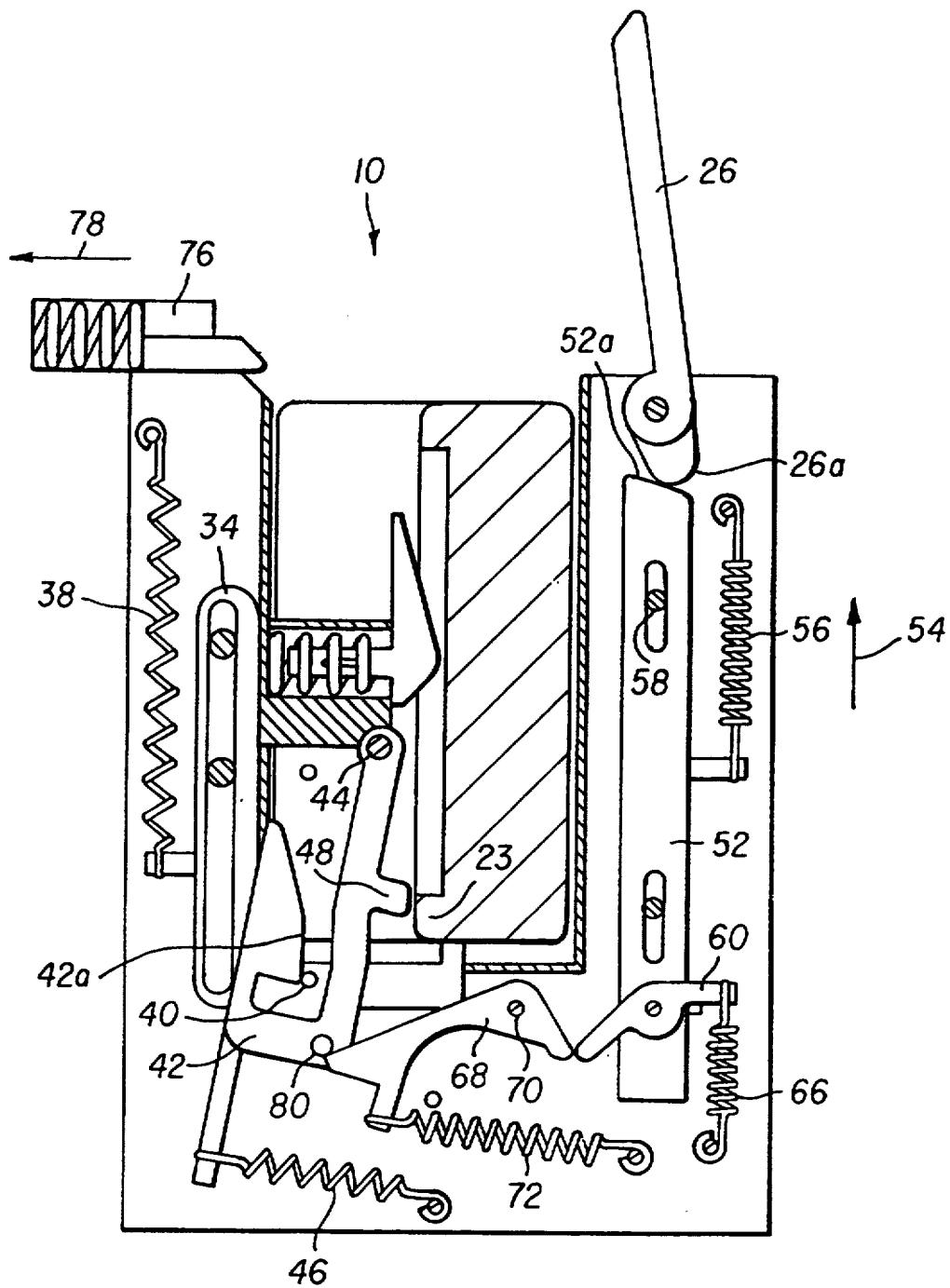

With reference to FIG. 7, when it is desired to remove the film cartridge from the loading chamber, door latch 76 is moved in the direction of arrow 78. Cover door 26 will open part way under the influence of plate 52 and tension spring 56. The door can then be grasped and opened further. As the door is opened, the interaction of cam surface 26a and surface 52a push plate 52 in a direction opposite to arrow 54. As a result, rocker arm 60 is moved in the same direction. The rocker arm contacts member 68, causing member. 68 to rotate clockwise about pin 70. As member 68 rotates, it contacts a pin 80 located on lock member 42, causing the lock member to rotate clockwise about pin. As the lock member rotates, lock lip 48 disengages portion 23 of lip 14. Additionally, cam surface 42a is moved relative to pin 40. Now, the film cartridge and elevator 34 are no longer retained in the lowermost position in the loading chamber.

Figure 8:
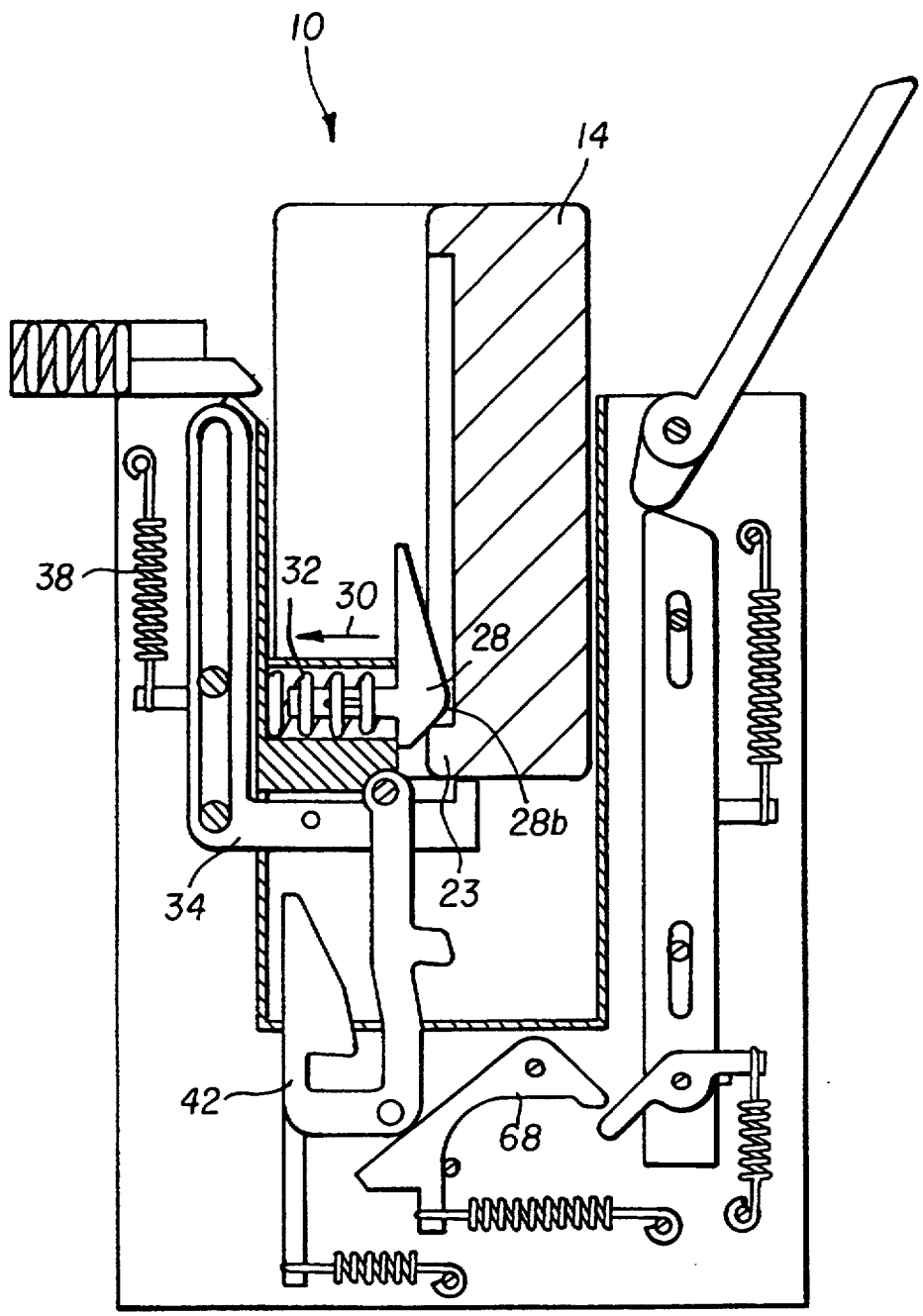

Referring to FIG. 8, tension spring 38 raises elevator 34 and, consequently, film cartridge 10 such that the film cartridge is moved partially out of the loading chamber. It should be noted that the cam profile of all the appropriate surfaces is such that cover door 26 is substantially opened before elevator 34 starts to move the film cartridge from the loading chamber. Consequently, the film cartridge will not bang into the cover door as the film cartridge is moved out of the loading chamber, thereby preventing damage to the film cartridge and/or cover door.

Member 68 and lock member 42 return to their original positions under the influence of their respective tension springs. The film cartridge is prevented from being moved further out of the loading chamber by the engagement of inclined surface 28b of retention member 28 with portion 23 of lip 14. The retention member can be disabled by grasping the film cartridge and pulling the film cartridge out of the loading chamber. Portion 23 of lip 14 pushes retaining member 28 in the direction of arrow 30 against the force of spring 32. Once portion 23 has bypassed retention member 28, the retention member is returned to its original position by spring 32.

The invention has been described with reference to a preferred embodiment. However, it will be appreciated that variations and modifications can be effected by a person of ordinary skill in the art without departing from the scope of the invention.

| PARTS LIST FOR FIGS. 1-8 | | | |
| --- | --- | --- | --- |
| 10 | film cartridge | 60 | rocker arm |
| 12 | housing | 62 | pin |
| 14 | lip | 64 | projection |
| 16 | spool | 66 | spring |
| 18 | opening | 68 | member |
| 20 | groove | 70 | pin |
| 22 | inner surface | 72 | spring |
| 23 | portion of lip 14 | 74 | pin |
| 24 | portion of a camera | 76 | door latch |
| 25 | loading chamber | 78 | arrow |
| 26 | cover door | 80 | spring |
| 26a | cam surface | | |

-continued

| PARTS LIST FOR FIGS. 1-8 | |
|---|---|
| 28 | retention member |
| 28a | inclined surface |
| 28b | inclined surface |
| 30 | arrow |
| 32 | spring |
| 34 | elevator |
| 36 | arrow |
| 37 | pins |
| 38 | spring |
| 40 | pin |
| 42 | lock member |
| 42a | cam surface |
| 44 | pivot |
| 46 | spring |
| 48 | lock lip |
| 50 | arrow |
| 52 | plate |
| 52a | cam surface |
| 54 | arrow |
| 56 | spring |
| 58 | pins |

What is claimed is:

1. A camera, comprising:
a loading chamber for receiving a film cartridge; and
means for engaging the film cartridge during movement of the film cartridge from the loading chamber, which allows the film cartridge to move partially out of the loading chamber but prevents the film cartridge from completely moving out of the loading chamber, and which is capable of being disabled to allow the film cartridge to be completely moved out of the loading chamber, said engaging means including a spring loaded member which is extendible into a groove located on the film cartridge to contact a portion of the film cartridge at one end of the groove to thereby prevent the film cartridge from moving completely out of the loading chamber.

2. The camera of claim 1, further comprising:
means for moving the film cartridge from the loading chamber.

3. The camera of claim 2, further comprising:
a door for covering an entrance to said loading chamber, said door including a surface which engages a surface of a portion of said moving means, at least one of said moving means' surface and door surface having a cam profile which permits said door to be substantially opened before said moving means starts to move said film cartridge from said loading chamber such that said film cartridge does not contact said door.

4. The camera of claim 2, further comprising:
a door for covering an entrance to said loading chamber, said door engaging said moving means, said door and said moving means being configured such that when said door is in an open position, the insertion of said film cartridge completely into said loading chamber will not move the open door.

5. The camera of claim 2, wherein said loading chamber is formed to receive and discharge the film cartridge end first.

6. The camera of claim 2, wherein said moving means applies no force for urging said film cartridge out of said loading chamber prior to moving said film cartridge out of said loading chamber.

7. Apparatus for taking pictures, comprising:
a film cartridge;
a camera having a loading chamber for receiving the film cartridge; and
means on the camera and film cartridge, which engage during movement of the film cartridge from the loading chamber, for allowing the film cartridge to move partially out of the loading chamber without allowing the film cartridge to be completely moved out of the loading chamber, said allowing means being capable of being disabled to allow the film cartridge to be completely moved out of the loading chamber, said allowing means including a spring loaded member which is extendible into a groove located on the film cartridge to contact a portion of the film cartridge at one end of the groove to thereby prevent the film cartridge from moving completely out of the loading chamber.

8. A film cartridge for use in a camera, said film cartridge comprising:
a housing;
a spool rotatably supported within the housing; and
photographic film wound on the spool, the housing having a groove on its outer surface essentially parallel to the spool, the groove extending a substantial portion of the length of the housing, at least one end of the groove ending immediately prior to reaching an edge of the housing, said groove being engageable by a member in the camera such that during movement of the housing from a loading chamber in the camera, the housing is allowed to move partially out of the loading chamber but is prevented from completely moving out of the loading chamber when the spring loaded member contacts said edge of said housing.

9. The film cartridge of claim 8, wherein said housing includes a lip from which the photographic film can be thrust, said groove being located on said lip.

10. The film cartridge of claim 9, wherein said groove is located on an inner surface of said lip.

* * * * *